United States Patent [19]

Vaughan

[11] 4,389,288

[45] Jun. 21, 1983

[54] CATALYZED ELECTROCHEMICAL GASIFICATION OF CARBONACEOUS MATERIALS AT ANODE AND PRODUCTION OF HYDROGEN AT CATHODE

[75] Inventor: Ronald J. Vaughan, Orinda, Calif.

[73] Assignee: Chevron Research Company, San Francisco, Calif.

[21] Appl. No.: 305,876

[22] Filed: Sep. 28, 1981

[51] Int. Cl.$^3$ ............................ C25B 1/00; C25B 1/04
[52] U.S. Cl. ...................................... 204/101; 204/129
[58] Field of Search ................................ 204/101, 129

[56] References Cited

U.S. PATENT DOCUMENTS

| | | | |
|---|---|---|---|
| 4,268,363 | 5/1981 | Coughlin | 204/101 |
| 4,279,710 | 7/1981 | Coughlin | 204/101 |
| 4,302,320 | 11/1981 | Lewis | 204/101 |
| 4,341,608 | 7/1982 | St. John | 204/129 |

OTHER PUBLICATIONS

"Voltammetry & Electrolysis of Coal Slurries & H-Coal Liquids" by R. P. Baldwin et al., *Fuel*, 1981, vol. 60, Aug., pp. 739-743.

*Primary Examiner*—R. L. Andrews
*Attorney, Agent, or Firm*—D. A. Newell; J. M. Whitney; V. J. Cavalieri

[57] ABSTRACT

The electrochemical gasification reaction of carbonaceous materials by anodic oxidation in an aqueous acidic electrolyte to produce oxides of carbon at the anode and hydrogen at the cathode of an electrolysis cell is catalyzed by the use of an iron catalyst.

9 Claims, No Drawings

CATALYZED ELECTROCHEMICAL GASIFICATION OF CARBONACEOUS MATERIALS AT ANODE AND PRODUCTION OF HYDROGEN AT CATHODE

BACKGROUND OF THE INVENTION

1. Field of the Invention

This invention relates to the use of an iron catalyst in the electrochemical gasification of carbonaceous materials in an aqueous acidic electrolyte.

2. Prior Art

It is known in the art that carbonaceous materials when mixed with an aqueous acidic electrolyte in an electrochemical cell through which a direct current passes, electrochemically react reducing water to hydrogen at the cathode and oxidizing the carbonaceous material to oxides of carbon at the anode.

Thus, U.S. Pat. No. 4,268,363 teaches the electrochemical gasification of carbonaceous materials by anodic oxidation which produces oxides of carbon at the anode and hydrogen or metallic elements at the cathode of an electrolysis cell.

U.S. Pat. No. 4,226,683 teaches the method of producing hydrogen by reacting coal or carbon dust with hot water retained as water by superatmospheric pressure. The pressure controlled by the use of an inert dielectric liquid which washes the electrodes and while doing so depolarizes them by absorption of the gases.

U.S. Pat. No. 4,233,132 teaches a method wherein electrodes are immersed within oil which forms a layer over a quantity of water. When current is passed between the electrodes, water is caused to undergo electrodecomposition. Gaseous hydrogen is collected in the sealed space above the oil-water layers, and the oxygen is believed to react with the constituents in the oil layer.

As acknowledged in U.S. Pat. No. 4,226,683, the principal problem in the past use of this principle for commercial production of hydrogen, was the slow rate of the electrochemical reaction of coal or carbon and water. It has now been found that iron, when added to an aqueous acidic electrolyte containing the carbonaceous material, and preferably iron in the +3 valence state, catalyzes the rate of reaction and assists in obtaining more complete oxidation for the electrochemical oxidation of the carbonaceous material at the anode thus making the commercial production of hydrogen or method of electrowinning commercially feasible.

SUMMARY OF THE INVENTION

As described above, it is well known that carbonaceous material such as coal can be oxidized at the anode of an electrochemical cell containing an aqueous acidic electrolyte with the simultaneous production of oxides of carbon at the anode and hydrogen at the cathode. For example, focusing on the carbon in coal and representing it by C, this anodic reaction can be written according to the stoichiometry:

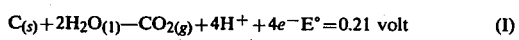

$$C_{(s)} + 2H_2O_{(l)} \rightarrow CO_{2(g)} + 4H^+ + 4e^- \quad E° = 0.21 \text{ volt} \quad (I)$$

in combination with the simultaneous cathodic reaction

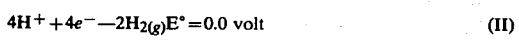

$$4H^+ + 4e^- \rightarrow 2H_{2(g)} \quad E° = 0.0 \text{ volt} \quad (II)$$

The net reaction, that is the sum of equations (I) and (II) is:

$$2H_2O_{(l)} + C_{(s)} \rightarrow CO_{2(g)} + 2H_{2(g)} \quad E° = 0.21 \text{ volt} \quad (III)$$

In these equations, E° is the standard thermodynamic electrode potential and the symbols (g), (s) and (l) symbolize the gaseous, solid and liquid states, respectively. Equation (III), the reaction between coal and water, caused by impressing a potential of 0.21 volt or more on a suitable electrochemical cell, is what is referred to in U.S. Pat. No. 4,268,363 as the electrochemical gasification of coal which reference is incorporated totally herein by reference.

It has now been found that the addition of a sufficient amount of iron in the elemental or +2 or +3 valence state or mixtures thereof, to the carbonaceous material undergoing oxidation in an aqueous acidic electrolyte at the anode will increase the rate of reaction of the oxidation process. The iron catalyst assists the oxidation of carbonaceous material in going to completion and increases the amount of current produced at the anode per given operating voltage.

DETAILED DESCRIPTION

The carbonaceous materials suitable for use in accordance with the present invention include a wide variety of material such as bituminous coal, chars made from coal, lignite, peat, active carbons, coke, carbon blacks, graphite; wood or other lignocellulosic materials including forest products, such as wood waste, wood chips, sawdust, wood dust, bark, shavings, wood pellets; including various biomass materials as land or marine vegetation or its waste after other processing, including grasses, various cuttings, crops and crop wastes, coffee grounds, leaves, straw, pits, hulls, shells, stems, husks, cobs and waste materials including animal manure; sewage sludge resulting from municipal treatment plants, and plastics or the scraps or wastes formed in the production of plastic such as polyethylene, cellulose acetate and the like. Thus, it is seen that substantially any fuel or waste material whether a liquid, such as oil, a gas, such as methane or other hydrocarbon or waste material containing carbon, with the exception of $CO_2$, provides a suitable source of carbonaceous material for use according to this invention.

The particular apparatus used to carry out the electrolytic oxidation of carbonaceous materials is not critical. Substantially, the same apparatus and techniques that are utilized in the electrolytic decomposition of water as well as those described in U.S. Pat. Nos. 4,268,363, 4,226,683 and 4,233,132 which references are incorporated herein by reference, can be used with the method of this invention. Any selection of appropriate changes in use of materials and/or technique is well within the skill of those versed in the art to which this invention applies.

The cells described in U.S. Pat. No. 4,268,363 including the use of acidic aqueous electrolytes, selection of anode and cathode materials and the optional but preferred use of cell membranes to keep the carbonaceous material on the anode side are most preferred.

While the electrode materials described in U.S. Pat. No. 4,268,363 are suitable for use in the method of this invention, anode materials which were found to perform especially well include an $RuO_2/TiO_2$ on a Ti substrate and an $IrO_2/TiO_2$ on a Ti substrate, which anodes are both commercially available.

The preferred acidic aqueous electrolytes that can be employed have a pH of less than 3 and include solutions of strong acids such as sulfuric acid, nitric acid, hydrochloric acid, phosphoric acid and the like.

While temperatures from above the freezing point of water and greater may be used, temperatures of from about 25° C. to 350° C. are preferred. Temperatures of from 120° C. to 300° C. are most preferred especially when using solid carbonaceous materials such as coal. At temperatures below 140° C. the reactivity of solid carbonaceous materials such as coal steadily decreases as the electrochemical oxidation proceeds. This decreased reactivity is believed to be caused by surface oxides building on the surface of the coal which hinders further sustained reactivity of the coal. At temperatures of about 140° C. and greater, the reactivity of the coal is sustained and no substantial decrease is observed.

Since it is desired to maintain the reaction in a liquid phase, it is, of course necessary, that at elevated temperatures, the reaction be carried out at elevated pressure. Generally, pressures of from about 2 to 400 atmospheres are satisfactory.

It has also been found that the addition of the iron catalyst to a solid carbonaceous material such as coal will sustain the activity of the coal longer at temperatures below 120° C. as compared to systems not containing the iron catalyst. Also, the catalytic effects of the iron catalyst are more pronounced at the higher temperatures.

While iron may be used in its elemental state, iron in its +2 and +3 valence, i.e. ferrous and ferric states, respectively, are preferred. Most preferred is the use of iron in the +3 valence state. Thus, inorganic iron compounds such as iron oxides, iron carbonate, iron silicates, iron sulfide, iron oxide, iron hydroxide, iron halides, iron sulfate, iron nitrate, and the like, may be used. Also, various organic iron salts and complexes, such as salts of carboxylic acids, e.g., iron acetates, iron citrates, iron formates, iron glyconates, and the like, iron cyanide, iron chelate compounds, such as chelates with diketones as 2,4-pentanedione, iron ethylenediaminetetracetic acid, iron oxalates, and the like.

While the iron catalyst may be used at a concentration up to the saturation point in the aqueous electrolyte, the preferred range of iron catalyst is in the range of from 0.04 to 0.5 molar and most preferably from 0.05 to 0.1 molar concentration. While certain carbonaceous materials, such as coal, may contain iron as an impurity, an iron-containing catalyst from an external source is generally required in order to increase the rate of reaction, at least initially, to acceptable levels for commercial use. The iron catalyst can conceivably be generated in-situ by oxidizing sufficient iron-containing coal to generate an effective amount of iron catalyst in the electrolyte.

Of course, essentially iron-free carbonaceous materials, such as carbon black, requires an iron catalyst to be added from an external source.

Thus, in one embodiment of this invention, sufficient iron catalyst is added from an external source in order to supply the preferred range of catalyst, namely, 0.04 to 0.5 molar.

In a second embodiment, an effective amount of iron catalyst can be generated in-situ by oxidizing sufficient iron-containing coal, albeit initially at a slower rate, to supply the preferred range of a catalyst.

The catalyst generated would then be freed from the coal and be able to function in a similar manner as externally supplied iron catalyst.

In a third embodiment, a combination of externally supplied iron catalyst and in-situ generated catalyst can be used to supply the preferred range of catalyst, i.e., 0.04 to 0.5 molar.

The concentration or amount of carbonaceous material present in the electrolyte may vary over a wide range depending upon whether it is a liquid or solid and depending on particle size, however, the preferred range is from about 0.1 gm to 0.7 gm per ml.

The following examples will serve to illustrate the invention.

EXAMPLES

EXAMPLE 1

Electro production of hydrogen was conducted at constant voltage in a cell with a Nafion ™ membrane and catholyte and anolyte solutions being stirred with magnetic stirrers.

The aqueous electrolyte was 0.5 M $H_2SO_4$ for both catholyte and anolyte solutions. Total cell volume was 500 ml; temperature was 180° C. Anode was 98 $cm^2$ of iridium oxide/titanium dioxide coated titanium; cathode was platinum. The first experiment was conducted with no coal added to the anolyte. Results:

| 180° C. | |
|---|---|
| Cell Potential (V) | Current (A) |
| 1.00 | 0.05 |
| 1.30 | 0.15 |
| 1.70 | 1.00 |

EXAMPLE 2

Apparatus and conditions were the same as those in Example 1 except that the anolyte contained either 0.17 $g/cm^2$ of coal (WOW 3932) or coke (El Segundo).

| Coal | | Coke | |
|---|---|---|---|
| Cell Potential (V) | Current (A) | Cell Potential (V) | Current (A) |
| 1.00 | 0.48 | 1.00 | 0.21 |
| 1.30 | 1.50 | 1.30 | 0.79 |

EXAMPLE 3

The conditions and apparatus were identical to those in Example 2 except the anolyte was made 0.07 M in $Fe^{3+}$ by adding $Fe_2(SO_4)_3$.

| Coal | | Coke | |
|---|---|---|---|
| Cell Potential (V) | Current (A) | Cell Potential (V) | Current (A) |
| 1.00 | 1.09 | 1.00 | 1.24 |
| 1.30 | 3.16 | 1.30 | 3.17 |

What is claimed is:

1. In the method of electrochemical gasification of carbonaceous materials in an aqueous acidic electrolyte by anodic oxidation to produce oxides of carbon at the anode and hydrogen at the cathode of an electrolysis cell, the improvement which comprises:
   adding an amount of iron in its elemental, +2 or +3 valence state or mixtures thereof to the electrolyte containing the carbonaceous material sufficient to increase the rate of oxidation of the carbonaceous material at the anode.

2. The method according to claim 1 wherein the iron is present as a salt in a +2 or +3 oxidation state.

3. The method according to claim 1 wherein the electrochemical process is conducted at a temperature of from about 25° C. to 350° C.

4. The method according to claim 3 wherein the temperature is in the range of from about 120°-300° C.

5. The method according to claim 3 wherein the iron catalyst is present at a concentration of from about 0.04 to 0.5 molar.

6. The method according to claim 5 wherein the iron catalyst is present at a concentration of from about 0.05 to 0.1 molar.

7. The method according to claim 1 wherein said carbonaceous materials are selected from the group consisting of coal, lignite, peat, char, coke, charcoal, soot, carbon black, activated carbon, asphalt, graphite, wood, biomass materials, or sewage sludge.

8. The method according to claim 1 wherein the aqueous acidic electrolyte has a pH of 3 or less.

9. In the method of electrochemical gasification of carbonaceous materials in an aqueous acidic electrolyte by anodic oxidation to produce oxides of carbon at the anode of an electrolysis cell, the improvement which comprises adding an amount of iron in its elemental, +2 or +3 valence state or mixtures thereof to the electrolyte containing the carbonaceous material sufficient to increase the rate of oxidation of the carbonaceous material at the anode.

* * * * *